(12) United States Patent
Taube et al.

(10) Patent No.: US 6,279,926 B1
(45) Date of Patent: Aug. 28, 2001

(54) REMOVABLE WHEEL SYSTEM

(75) Inventors: Joanne Taube, Redford; Lee Forgosh, Manchester; Dave Palance; Katrina Palance, both of Milford; Kenneth Brumleve, Amherst, all of NH (US)

(73) Assignee: Tranzporter International LLC, Manchester, NH (US)

( * ) Notice: Subject to any disclaimer, the term of this patent is extended or adjusted under 35 U.S.C. 154(b) by 0 days.

(21) Appl. No.: 09/382,505

(22) Filed: Aug. 25, 1999

(51) Int. Cl.$^7$ ............................................. B62B 1/04
(52) U.S. Cl. ........................ 280/37; 280/47.24; 280/47.26
(58) Field of Search ............................ 280/35, 37, 79.11, 280/79.2, 79.3, 62, 63, 47.34, 47.35, 47.24, 47.26, 47.131; 190/107, 114

(56) References Cited

U.S. PATENT DOCUMENTS

| 3,861,703 | 1/1975 | Gould . |
| 3,889,965 | * 6/1975 | Zeitlin ............................ 280/47.131 |
| 4,506,897 | 3/1985 | Libit . |
| 4,545,592 | * 10/1985 | Taskovic ................................. 280/35 |
| 4,759,559 | 7/1988 | Moulton . |
| 5,188,381 | 2/1993 | Kho . |
| 5,456,342 | 10/1995 | Rekuc et al. . |
| 5,515,954 | * 5/1996 | Nordstrom ........................ 190/18 A |
| 5,529,156 | 6/1996 | Yang . |
| 5,634,538 | 6/1997 | Tsai . |
| 5,758,751 | * 6/1998 | Charles ................................ 190/107 |
| 5,758,752 | 6/1998 | Crumrine et al. . |
| 5,794,744 | 8/1998 | Lin . |
| 5,813,503 | 9/1998 | Chang . |

* cited by examiner

Primary Examiner—Richard M. Camby
(74) Attorney, Agent, or Firm—Scott J. Asmus; Vernon C. Maine

(57) ABSTRACT

A removable wheel system for luggage, baggage, portfolios, art tubes, knapsacks, golf bags, briefcases, and back packs. A frame structure with an integrated wheel base engages the article, and straps with attaching means secure the frame structure to the article. In one embodiment the frame structure has contacting lips upon which the luggage rests, while straps that are partly affixed to the luggage are threaded through securing slots of the frame structure and tightly secured. Cylindrical articles are carried by a frame structure with a Y shaped housing that secures the luggage to the frame by wrapping a strap around the luggage and engaging a securing slot on the frame.

11 Claims, 9 Drawing Sheets

REMOVABLE WHEEL SYSTEM

BACKGROUND OF THE INVENTION

Technical Field of the Invention

The present invention relates in general to wheeled luggage, baggage, portfolios, briefcases, golf bags, and carry-on cases. In particular, to a removable wheel system that can easily be affixed to such articles and allow wheeled transport. More specifically, this invention relates to a frame structure and wheelbase with an attaching means.

Luggage is the broad term used to describe the variety of shapes and sizes of containers used to transport goods. The contents of the luggage also varies in size, shape, value, and fragility. The one common denominator is that carrying luggage is burdensome and difficult, especially when combining the weight of the luggage, cumbersome shape/design, and weighty contents.

In order to address the difficulties carrying luggage, wheeled luggage and multi-purpose carriers developed. Wheeled luggage refers to the various suitcases and baggage that employ wheeling devices, and allow users to roll their luggage. The wheeled luggage typically deploys a handle to aid in the transport and are usually hard cased units that have a plurality of wheels integrated into the design. The wheels are permanent features of the luggage and may or may not be fully retractable within the luggage.

Multi-purpose carriers are those devices that are used to aid in transportation of luggage, packages, groceries and other items. The multi-purpose carriers and carts are additional pieces of gear that must be available to the user. Luggage and other items are placed onto the carriers, which allow wheeled transport. Some of these carriers may be rented in some transportation terminals, or they may be personal carriers that are carried and stored in addition to the luggage.

Various attempts have been made to incorporate wheels into luggage and portfolio designs. A pair of retractable/extendible rear wheels is discussed in U.S. Pat. No. 5,758,752, wherein the rear wheels store inside a wheel bracket integrated into the luggage design and automatically deploy and retract by a spring assembly. In U.S. Pat. No. 5,813,503, a luggage case with a deployable handle has retractable/extendible wheel sets pivotably mounted to the luggage where a spring controls the extension and actuates when the handle is engaged. Another luggage wheel design is shown in U.S. Pat. No. 4,862,165, where the wheel assemblies are integrated flanges connected by a shaft that attach to the luggage and engage the wheel assemblies. A wheel housing member with integrated wheels is shown in U.S. Pat. No. 5,456,342, where the member is affixed to the luggage by rivets or screws and can incorporate a shield member. Another integrated design, U.S. Pat. No. 5,634,538 is a wheel assembly fitted into an engaging portion of the luggage and fixedly attached.

Luggage and baggage carriers are also disclosed in the prior art. The invention discussed in U.S. Pat. No. 4,506,897 is for a collapsible luggage carrier that has an integrated wheel assembly with wheel brackets hingedly attached to a U shaped frame. The wheels fold in on the carrier, allowing more convenient storage of the device. Another carrier is shown in U.S. Pat. No. 4,759,559, where the wheels are adjustable in height and connected to a Y shaped support structure.

U.S. Pat. No. 5,529,156 is a frame for soft-sided luggage. A lightweight and rigid frame with built in wheel wells and a shaft between the wheels can be integrated into the design of the soft-sided luggage.

There have been some attempts at implementing removable wheels. U.S. Pat. No. 3,861,703 uses hook and loop (more familiarly known as Velcro) to attach the wheels, wherein a flat mount bracket has one section of a hook and loop strip and the mating hook and loop strip is on the luggage. Support structures are attachable to the sides of the luggage and connect with a receiving portion on the flat mount bracket. Another detachable wheel patent in disclosed in U.S. Patent No. 5,188,381, where a bracket is connected or integrated onto the luggage, and the U shaped wheel and axle assemblies are attachable to the bracket.

While the wheeled suitcases and multi-purpose carriers are effective in some situations, certain types of luggage are not equipped with integrated wheels. And, there are certain instances where wheels are burdensome and inconvenient. As an example, cleaning soft-sided luggage with permanent wheels is much more difficult than washing such luggage without such structures.

Soft-sided luggage is popular for a variety of reasons, including being lightweight and foldable into a convenient size for storage. Traditional knapsacks are being re-designed to include permanent wheel assemblies. Students that have to carry heavy loads in their knapsacks can now wheel the load. The lightweight and portable soft-sided luggage is also preferred for the transportation of certain objects, particularly art. The soft-sided carrying units can be machine-washed and compactly stored when not in use. Pockets and storage compartments are easily implemented, and rigidity is provided by removable foamcore, corrugated plastic or cardboard inserts. Integrating wheels permanently into the design of the soft-sided luggage detracts from its advantages.

In addition, permanent integrated wheel assemblies have certain disadvantages. Wheel assemblies that are fully retractable within the case consume considerable cargo space of the luggage. Those assemblies that are not retractable protrude beyond the necessary shape of the luggage, requiring more space for carrying and storage. The wheel assemblies add weight and cost to the luggage as well as manufacturing difficulties.

Certain articles require specialized luggage, and conventional wheeled assemblies would not be possible. The shape of art portfolios is generally sized to transport works that are long and high, but narrow in width. A typical portfolio case is approximately four feet in length, three feet in height, and five inches in width. The carrying cases are designed to carry the general size and shape of art works, mostly prints (framed or unframed), that are transported in rectangular portfolios. The professionals using these bags require bags that are sturdy, lightweight, and aesthetically pleasing to transport the valuable contents. Once the works are inserted into the portfolios, they become very heavy, making the transportation onerous and more difficult.

Other types and configurations of art portfolios are common, including tube articles used to transport artwork that is rolled. These are cylindrical soft-sided canisters with a zippered top cover. The diameter varies in size, but are typically four, six, eight, ten and twelve inches. They are generally three to six feet in length.

Golf bags are also cylindrical shaped bags, typically soft-sided, that carry expensive and heavy clubs. Some bags employ permanent wheel assemblies affixed to the bottom, making carrying and storage more difficult. Without wheels, the user must carry the bag even when not on the golf course.

What is needed is a simple and easy-to-use removable wheel assembly. The assembly should be cost effective to manufacture and be made with long-lasting materials. The unit should install and uninstall quickly and not interfere with the usage of the luggage whether attached or unattached. This device should not detract from the aesthetic design of the luggage.

SUMMARY OF THE INVENTION

Accordingly, an object of the present invention is to provide a removable wheel system for luggage, baggage, carriers, golf bags, knapsacks, attaches, all-purpose sports bags, art tubes and portfolios. Once attached, the wheels allow the user to comfortably wheel the luggage to the desired destination.

Another object is to provide a luggage system with an easy attachment and removal of the wheel structure. The wheels can be removed and stored in the luggage or kept in storage.

An object of the invention, in one preferred embodiment, is a wheel system comprising a wing-shaped frame, an axle with wheels, and an axle-retaining portion. The axle-retaining portion has a loop portion that is secured to luggage by a fastening belt that is affixed to the luggage. Hook and loop straps work well in providing a quick and efficient fastening belt. The frame supports the weight of the luggage and keeps the wheels from contacting the luggage.

An object of the invention is a removable wheel assembly for luggage comprising a support frame with a pair of contacting lips. Each respective pair of contacting lips contact a bottom surface of the luggage and provide support for the article. The support frame has an angled mid-section connecting the contacting lips to a wheel base section. An axle is secured at the wheel base section, wherein the axle has a wheel attached to said axle. There is a pair of elongated members with securing slots extending from the wheel base section. Furthermore, there is a strap on each side of the luggage, each strap having a secured end and a free end, wherein the secured end is affixed to the luggage, and wherein the free end engages the securing slot of each of said pair of elongated members. There also is a means of securing the free end.

Another object of the invention is a removable wheel assembly wherein the means of securing the free end is selected from the group consisting of hook and loop, snaps, rivets, buckles, zippers and fasteners. The assembly can be secured by a cinch and fastener system, which is commonplace in the industry.

Yet another object is removable wheel assembly wherein the axle has a pair of wheels. Each of the wheels should be located either by the affixed securing strap or at a place that optimizes the transport of the article.

Further object is a removable wheel assembly wherein the pair of elongated members are bolted to wheel base section. The axle portion can thereby be retained and secured under the elongated members. An alternate embodiment is to weld or manufacture the elongated members to the wheel base, changing the assembly aspects slightly.

And another object is a removable wheel assembly wherein the pair of elongated members are adjustably slidably secured to the wheel base section, wherein a distance between the pair of elongated members is adjustable. The elongated members could be deployed within a track on the wheel base, thus allowing the dimensions between the members adjustable and allow different size luggage.

Additionally, an object is a removable wheel assembly wherein the wheel is rotatably swivel. Depending on the embodiment, a swivel wheel could be used in the invention and provide certain attributes, especially if only using one wheel.

Yet another object, is a removable wheel assembly, wherein a pair of removable wheel assemblies are secured to the luggage. Rather than just having one wheel on the axle, two wheels provide more support and ease of operation.

And, an object is a removable wheel assembly, wherein the strap secures the removable wheel assembly to the luggage without being affixed to the luggage, and wherein the strap engages each of the securing slots of the pair of elongated members and wraps around the luggage. In this manner the straps do not need to be sewn, glued or otherwise affixed to the luggage.

A further object includes a removable wheel assembly for cylindrical luggage comprising a housing with a pair of side flanges, a back portion with back flanges, and a wheel base section, wherein the pair of side flanges are angularly disposed from a wheel base section. There is a securing slot on one of the side flanges, and a securing strap for securing the assembly to the luggage, wherein the strap engages the securing slot of the housing. There is also a means of securing the securing strap to hold the unit to the luggage. An axle is affixed to the housing, wherein the axle has a first side and a second side, and wherein a first wheel attached to the first side of the axle, and a second wheel is attached to the second side of the axle.

Another object is a removable wheel assembly for luggage wherein the means of securing the securing strap is selected from the group consisting of hook and loop, snaps, rivets, buckles, zippers, cinches and fasteners.

Additional object includes a removable wheel assembly wherein the axle has a pair of wheels connecting to the axle.

Another object includes a removable wheel assembly, further comprising an axle strap, wherein the axle strap has a free end and a secured end, and wherein the secured end is affixed to the luggage, and the free end is threaded around the axle and fastened.

An object of the invention is a removable wheel assembly, wherein the securing strap has a free end and a secured end, said secured end is affixed to the luggage and the free end is threaded through the securing slot.

Yet another object is a removable wheel assembly, further comprising a securing slot on each of the side flanges, and a second securing strap, wherein each securing strap engages a securing slot. Furthermore, a removable wheel assembly, wherein the wheel is rotatably swivel.

An object of the invention is a removable wheel assembly kit for luggage, comprising a wheeled support frame with a securing slot, a strap for securing the support frame to the luggage, wherein the strap engages the securing slot and wraps around the luggage, and there is a means of securing the strap.

Another object is a kit, wherein the wheeled support frame has a pair of contacting lips, wherein each of the pair of contacting lips contact a bottom surface of the luggage, and wherein the support frame has an angled mid-section connecting the contacting lips to a wheel base section. An axle is secured at the wheel base section, and wherein the axle has a wheel attached to the axle. Furthermore, a pair of elongated members extend from the wheel base section each with the securing slot.

A further object is a kit, wherein the wheeled support frame has a housing with a pair of side flanges, a back portion with back flanges, and a wheel base section; an axle affixed to the housing, wherein said axle has a wheel attached; wherein the pair of side flanges are angularly disposed from a wheel base section, each with the securing slot.

And yet a final object is a kit wherein the means of securing the strap is selected from the group consisting of hook and loop, snaps, rivets, buckles, zippers, cinches and fasteners.

The luggage of the preferred embodiment is a soft-sided portfolio that is washable and stores compactly. A preferred embodiment is made out of 1000 denier Cordura nylon or similar materials. This material is durable, puncture proof, washable, and water-resistant. These articles include exterior pockets, interior straps, extra-wide gusset, removable shoulder strap, two side handle positions and a top handle. An extra-wide gusset of five inches allows larger materials to be placed in the portfolio. Other special features include double zipper construction for accessing materials easily, hook and loop straps to secure interior side panels to protect and separate materials. These cases are made in many different sizes.

Still other objects and advantages of the present invention will become readily apparent to those skilled in this art from the following detailed description, wherein only a preferred embodiment of the invention is described, simply by way of illustration of the best mode contemplated for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

Figure 1:
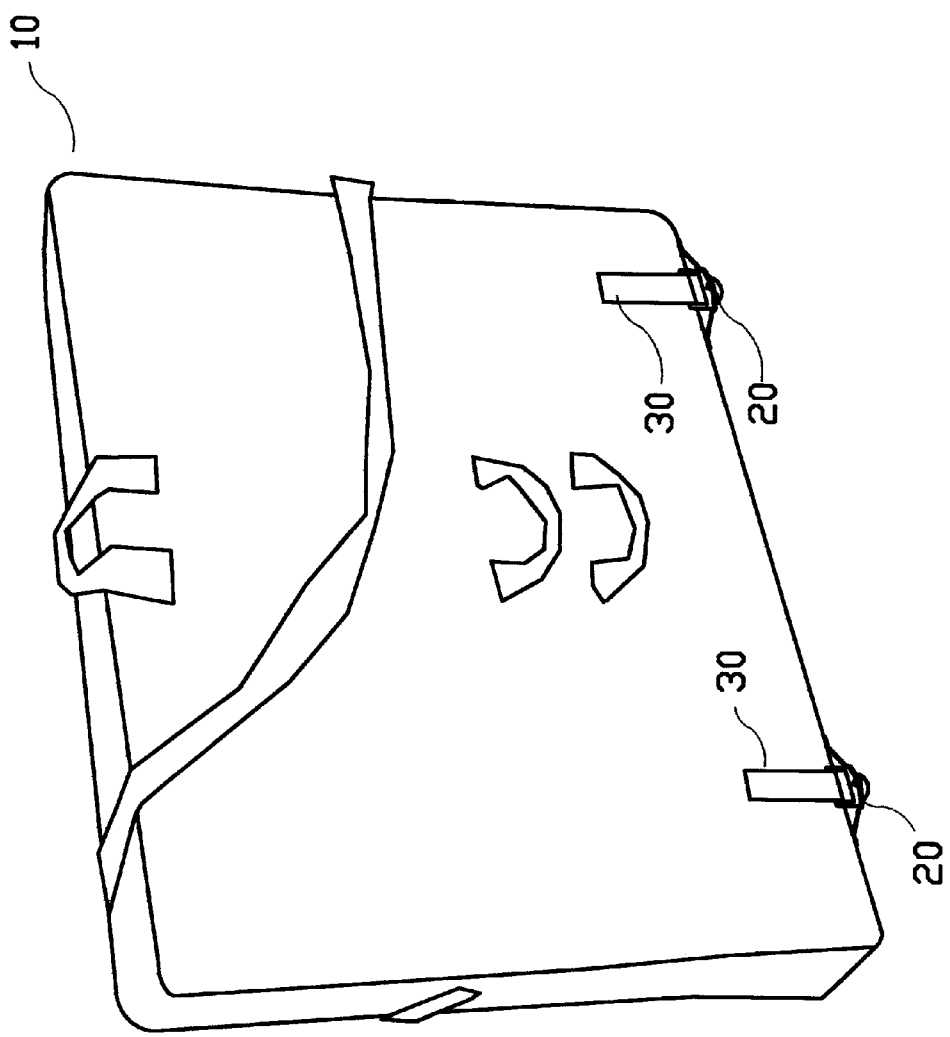
FIG. 1 is a depiction of the article in transit.

In FIG. 1 a portfolio case 10, typical in art transportation, has one removable wheel assembly 20 attached on a forward end, and a rearward removable wheel assembly 20. A single wheel assembly is within the scope of the invention, especially for portfolios that are shorter in length. The wheel assemblies 20 are secured to the portfolio 10 by straps 30 that engage a securing slot on the support frame of the wheel assembly. The invention functions with other sizes and shapes of luggage, and the portfolio is merely a preferred embodiment for descriptive purposes.

The straps 30 are single length units approximately two inches in width and ten inches in length. There is a loose end of approximately five inches and a secured end of approximately five inches. The secured end is fixedly attached to the luggage and the loose end goes through the securing slot. In one variation, the straps are secured using hook and loop (Velcro being a trademark for one particular hook and loop device), wherein the gripping means is on the loose end and the receiving end is on the secured end. The gripping means is typically rows of small plastic hooking structures that adhere to the woven surface of the receiving end. Either the gripping end or the receiving end can be affixed to the portfolio. In the preferred embodiment, the receiving end is affixed to the sides of the portfolio. The straps 30 are affixed to the portfolio 10 by stitching or adhesive means. The placement of the straps is designed to optimize the weight displacement of the luggage.

Other securing means are within the scope of the invention, including buckles, buttons, ties, fasteners, and snaps. The wheel assembly of the preferred embodiment only requires a securing means engage the wheel assembly and provide a means for simple removal. There are multiple implementations possible to secure the wheel assembly to the luggage and provide easy attachment and removal. A single strap with securing means such as hook and loop can go around the luggage and secure the wheel assembly firmly in place. A cinch with fastening buckle is common in the industry and used in many devices intended for children. Thus, the invention can be in kit form and usable on any luggage within the dimensions of the invention.

On a portfolio 10 that is approximately 3.5 feet long and using two wheel assemblies 20, the straps 30 are placed about eight inches from each respective end. The portfolio 10 would rest entirely on the wheel assemblies 20. A portfolio 10 using a single wheel assembly 20 would place the straps 30 approximately twelve inches from either end of the portfolio 10 sides. In this situation, the portfolio 10 could employ only one pair of securing straps 30 and a single wheel assembly 20, reducing manufacture costs. Two sets of straps would allow the user to place the wheel assembly on either set of straps. Using either method, the user wheels the portfolio and guides it by pushing, pulling or walking alongside.

A post can be used in place of a wheel assembly to allow the portfolio 10 to stand without support, while not interfering with the ease of rolling the portfolio 10 on the single wheel assembly 20.

The use of temporary stiffeners, such as cardboard, foamcore, wood, or plastic, on the bottom and sides provide temporary rigidity to the luggage. The stiffeners can be inserted into specially designed pockets of the device. Other types and applications of stiffeners are well known, including a single piece stiffener that slips inside the portfolio. The wheel assemblies require some structural firmness on the bottom side, either from stiffeners, the contents of the portfolio, or a combination of the two. The invention is not limited to soft-sided luggage, and is equally amenable to the more conventional hard-cased luggage as well as other carrying cases such as golf club bags and knapsacks.

Figure 2:
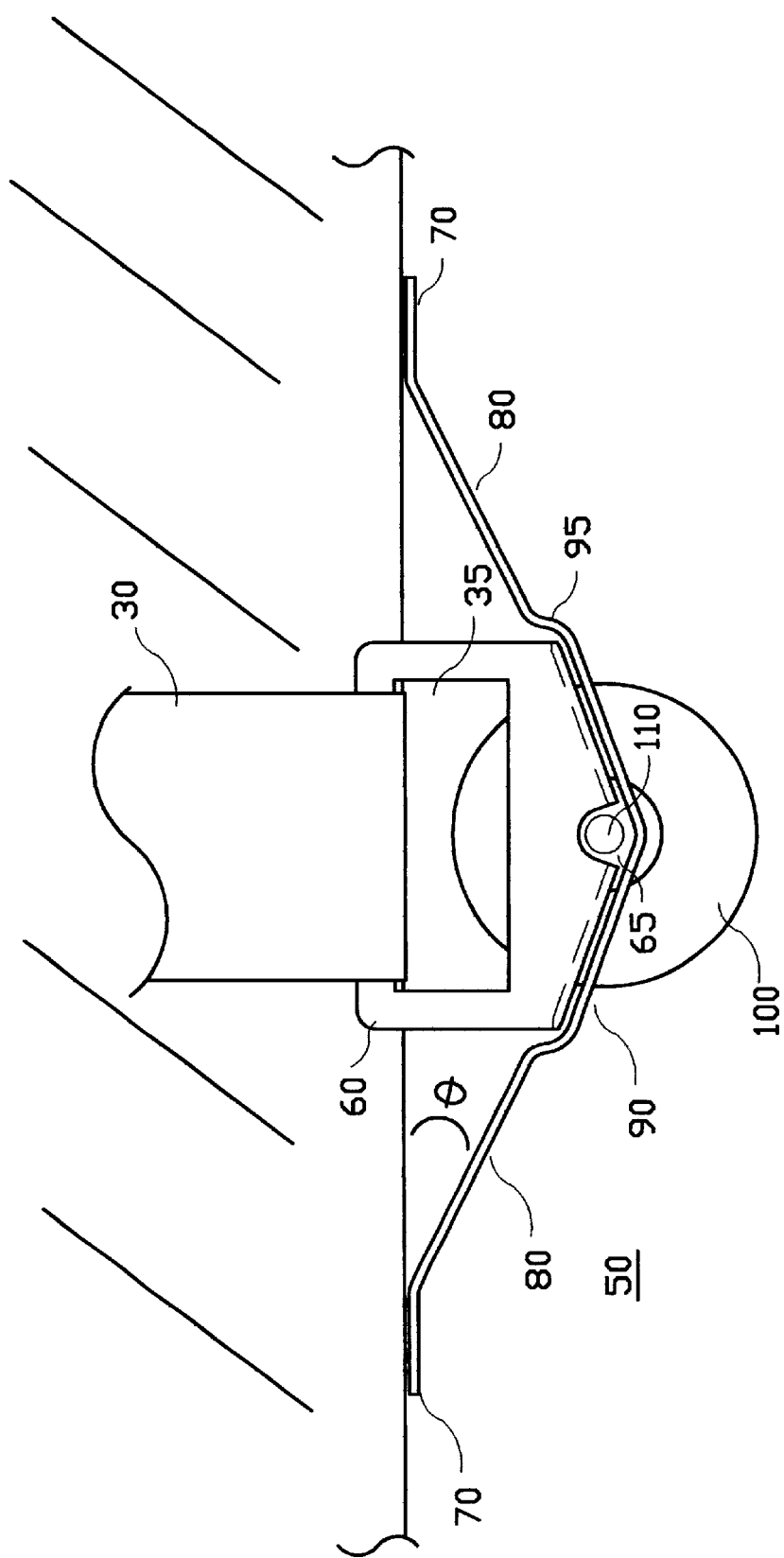
FIG. 2 is a side perspective of the frame structure and wheel assembly.
Figure 4:
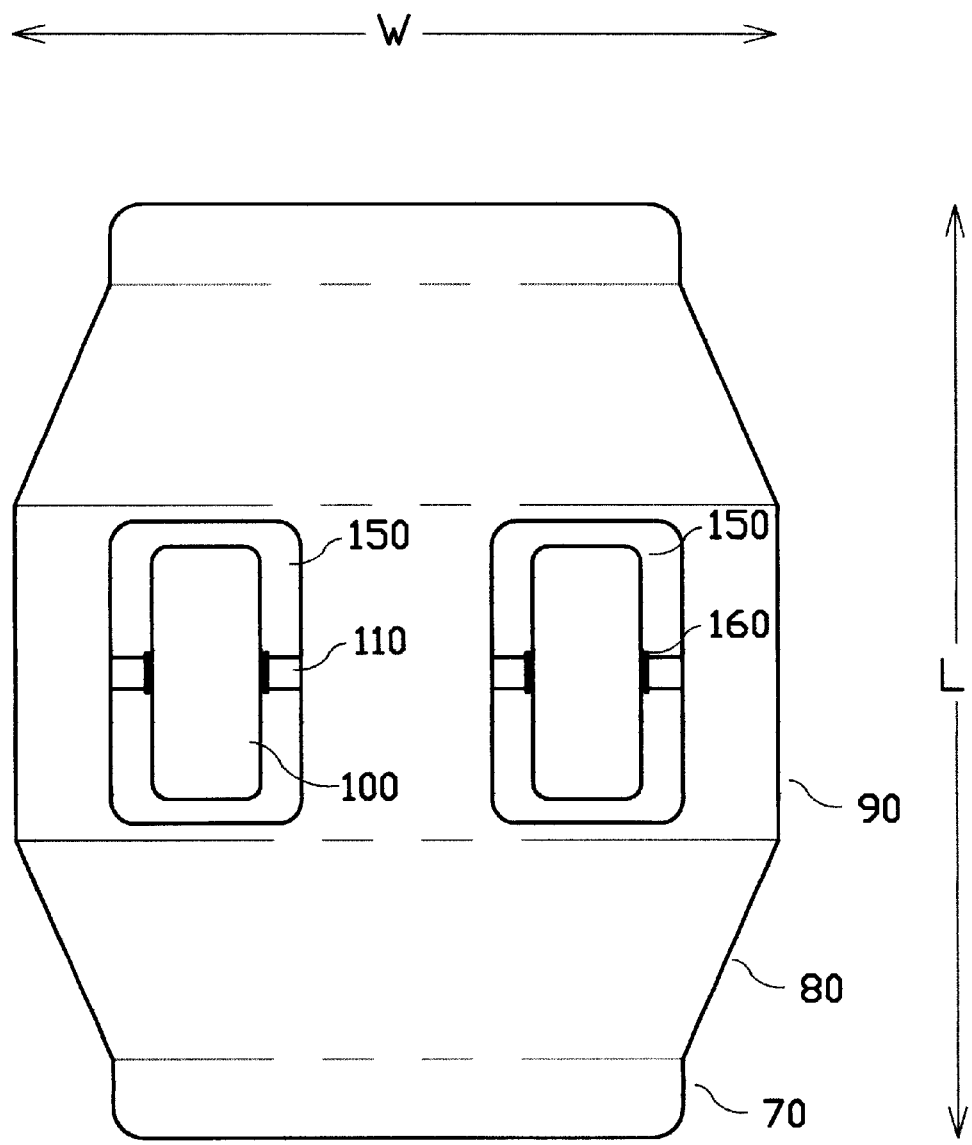
FIG. 4 is a bottom perspective of the assembly.

The workings of the wheel assembly 20 are detailed more precisely in FIG. 2 and FIG. 4. The frame 50 is approximately wing-shaped, contacting the portfolio 10 at the contacting lips 70 on both sides of the wheel 100. The contacting lips 70 are a small flattened region that engage the luggage. The middle portion of the frame 80 angles downward at an angle $\theta$ from the uppermost portion at some angle between 20 degrees and 60 degrees. The angle $\theta$ and the length of the middle portion 80 are established in order to keep the wheels 100 from touching the luggage 10.

In one embodiment, the frame securing member 60 sits within a wheel base seating portion of the frame 90. The wheel base portion 90 has notches 95 that provide better mating of the frame securing member 60, especially if these are two separate components. The frame securing member 60 can be welded, riveted, bolted or otherwise secured onto the frame. An attachable frame securing member 60 permits the pre-assembly of the wheel assembly 20.

The frame securing member 60 has a securing slot 35 that mates with the securing strap 30. The strap 30 goes through the securing slot 35 and maintains the device in contact with the portfolio 10.

It is well within the scope of the invention to employ a single manufactured structure 50 without a separate frame securing member 60, thus eliminating the need for the notches 95, and would likely reduce manufacturing and assembly costs.

An axle opening 65 in the frame permits the axle 110 to engage the locking washers 160 and wheels 100 and allows the wheeled transport. In a preferred embodiment, the wheels 100 have integrated bushing that allow the wheels 100 to spin freely without rotating the axle 110. The wheels 100 are retained in position along the axle 110 by locking washers 160. The axle 110 is secured to the frame 50 by press fit means or interference fit means if the frame 50 is a single manufactured unit. If the axle 110 is secured using a separate securing member 60, it is attached to the wheel base section of the frame 50 by welding, riveting, screws, bolts, or adhesives. The axle 110 may or may not rotate during operation, but using wheels 100 with integrated bushings will not be effected by the axle rotation.

If the wheels 100 are to operate without bushings or bearings, the axle 110 will have to rotate in order for the wheels 100 to rotate. In this situation, a sleeve is used to encase the axle 110 and allow the axle 110 to freely rotate.

The support frame 50 can be manufactured from different metals and plastics, including acrylonitrile butadiene styrene (ABS), and polyethylene, high density (HDPE). The surface edges should be rounded to remove any burrs or sharp edges. Aesthetics are also important, and the color of the frame 50 is important to certain consumers. Although typically low gloss black, the frame 50 can be manufactured in a variety of colors or painted to match a particular luggage ensemble.

Figure 3:
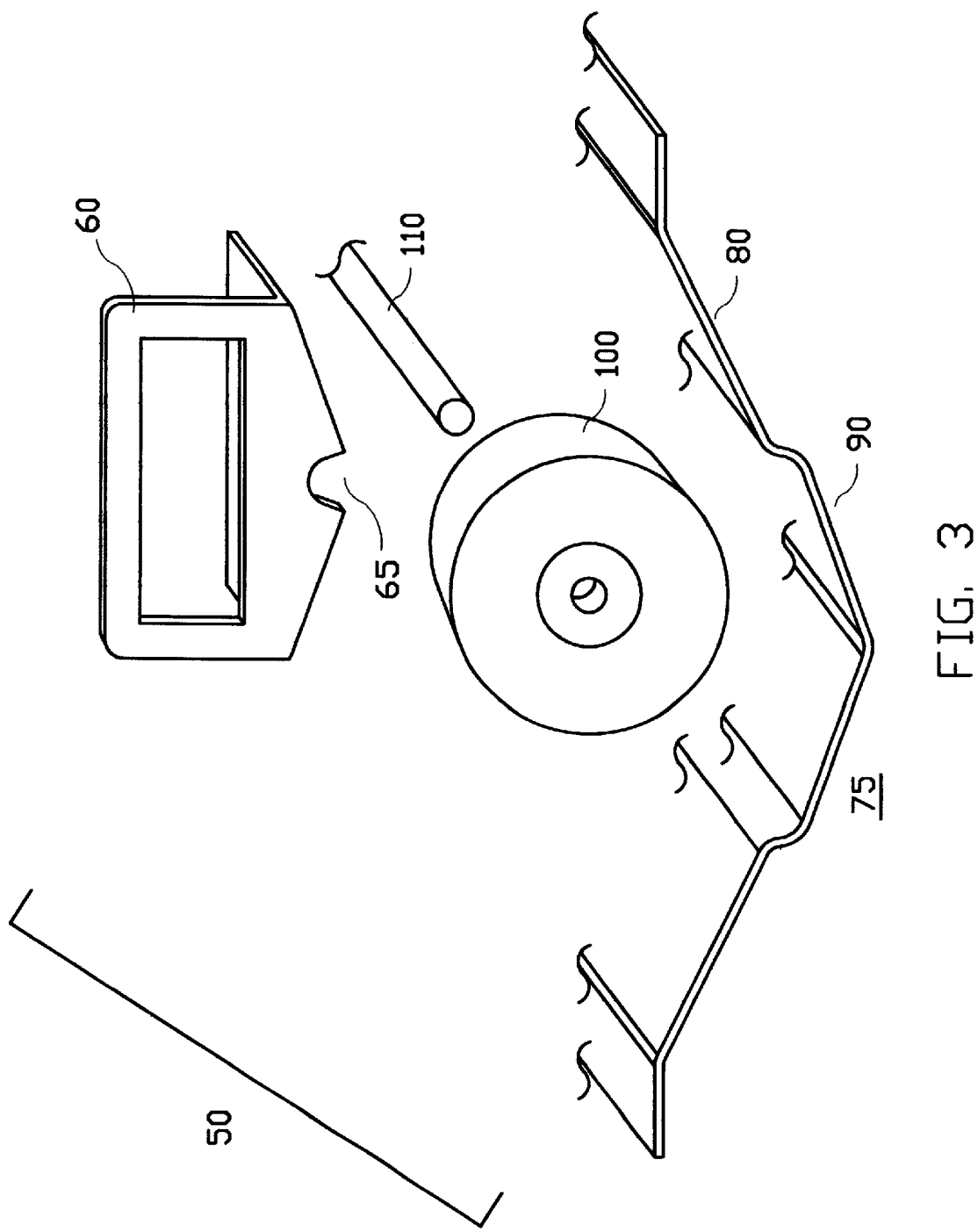
FIG. 3 is an illustration of the separate components of the assembly.

As shown in FIG. 3, one embodiment for manufacturing and assembling the support frame 50 is to use separate components comprising a wing-shaped frame member 75, a securing member 60, and the wheel 100 and axle 110. The securing member 60 has a notched section 65 for the axle 110, and which retains the axle 110 in a fixed position when the securing member 60 is affixed to the wing-shaped frame 75. The securing member 60 is secured to the wheel base section 90 of the wing-shaped frame 75 by welding, riveting, screws, bolts, or adhesives.

An alternative embodiment for manufacturing and assembling is to make the securing member 60 an integral part of the support frame 50. Assembly time would be decreased because the only installation would be the axle 110, wheel 100, and locking washers 160.

A bottom view of the removable wheel assembly is shown in FIG. 4. The width of the frame 50, W, is designed to accommodate the width of the luggage 10. In this preferred embodiment, the width of the support frame 50 is approximately six inches. It is within the scope of the invention to provide wider or narrower widths depending upon the width of the luggage 10. It is also within the scope of the invention to employ an adjustable width support frame using extendable side securing members. The securing member from FIG. 3 can employ an extended securing section that mates with the wing shaped bracket. The securing member 60 is either pulled out or pushed in so that the width conforms to the particular luggage article. Once the width is set, a wing-nut or similar locking means secures the securing member 60 to the frame 75.

The wheel 100 is kept in place within the open space 150 of the wheel chamber by locking washers 160 that are attached to the axle 110 on either side of the wheel 100. The wheel assembly 20 can operate with a single wheel or a plurality of wheels, depending on the size and shape of the article 10. In the preferred embodiment of a portfolio 10, two wheels are utilized.

The length of the support frame, L, is approximately 7.5 inches from the outermost edges of the contacting lips 70. The width of the contacting lips in the preferred embodiment is 0.75 inches. The angled middle section 80 is approximately 1.75 inches and the angular displacement θ is approximately 45 degrees. The length of the middle section and the angular displacement are designed so that the wheel does not scrape the luggage surface when rotating. The securing members 60 extends perpendicular from the axle and measure 1.75 inches from the axle 110 in the preferred embodiment. The wheels 100 are 1.625 inches in diameter. Larger wheels would require a different angle and/or a longer angled middle section 80. The axle 110 is 0.25 inches in diameter, and uses locking washers 160 to retain the rotating wheel 100 in the proper position. As is obvious to one skilled in the art, the present invention is adaptable to many different articles by varying the individual elements.

Figure 5:
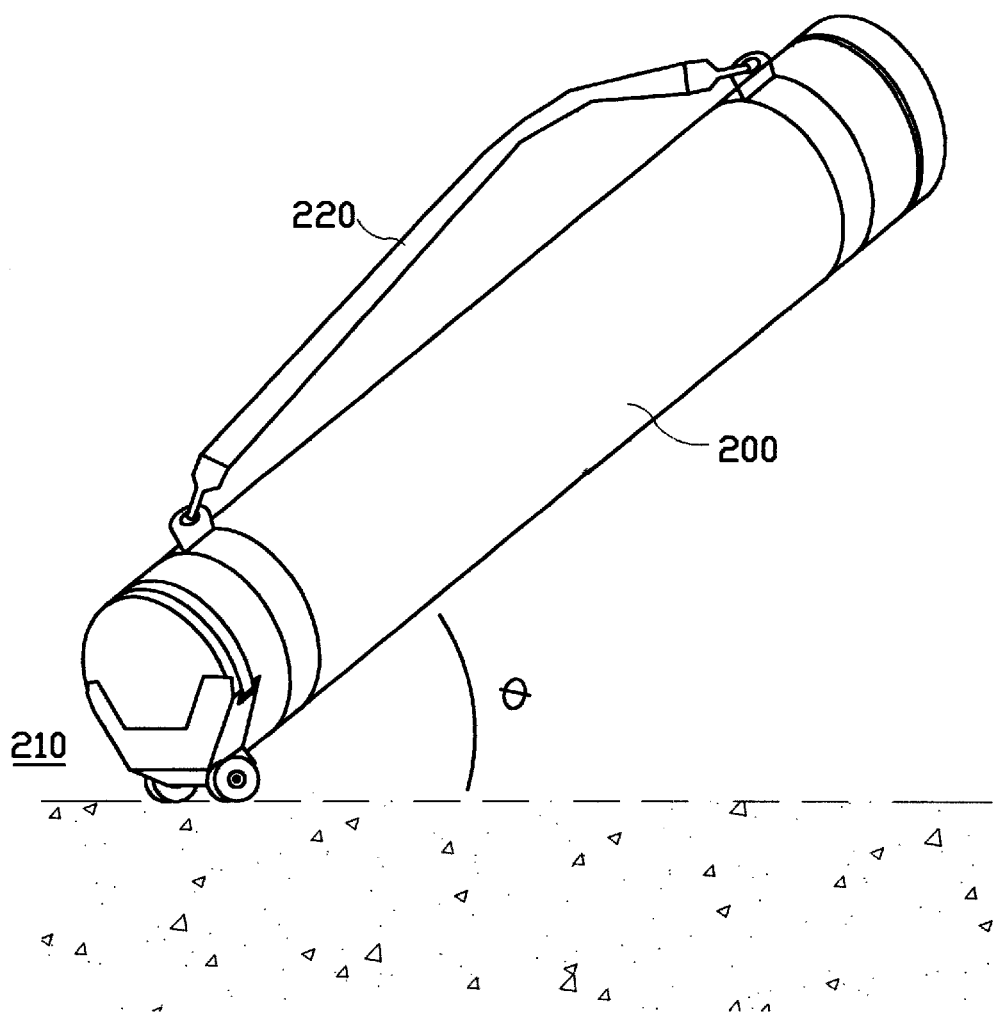
FIG. 5 is a depiction of the cylindrical article in transit.

FIG. 5 shows a variation of the present invention in the form of a removable wheel system for approximately tube-shaped luggage 200. The tube wheel assembly 210 allows wheeled transport at an angle θ which is about 45 degrees. The handle 220 is on the top portion of the luggage 200 allowing the luggage 200 to be easily wheeled.

Figure 6:
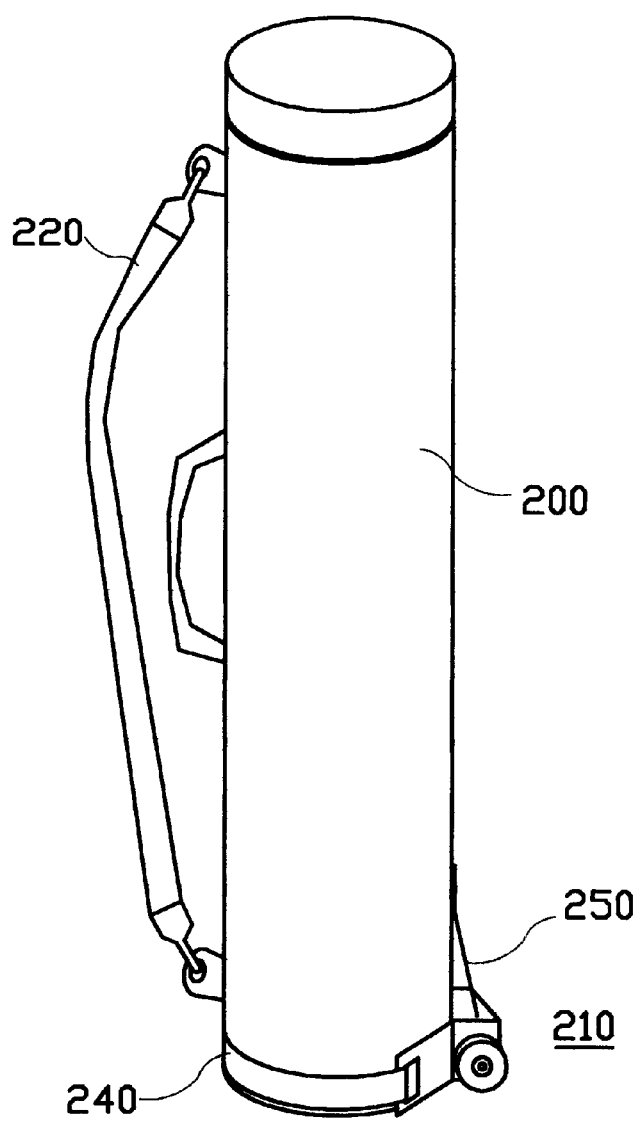
FIG. 6 is an illustration of the cylindrical article free-standing with assembly attached.

The tube wheel assembly 210 is designed so that the tube-shaped luggage 200 can stand vertically with no support as shown in FIG. 6. The wheel assembly 210 is strapped to the luggage 200 by a single-piece strap 240 that goes from one securing slot 230 to a securing slot 230 on the other side. Using two independent straps 240 is within the scope of the embodiment, whereby each securing slot 230 has its own strap 240.

The use of a single strap in conjunction with a single wheel assembly 210 allows the present invention to be sold as a kit. It can be used by any cylindrical or tube shaped luggage to allow wheeled transport, particularly golf bags. The orientation of the luggage 200 is important for proper rolling, and the wheel assembly 210 should be opposite the handle 220.

An optional axle strap 250 provides further security and retention by wrapping around the axle 110. Although not a necessity, this strap 250 gives an additional directional moment, pulling the wheel assembly 210 upwards into the luggage 200 in conjunction with the strap 240 pulling the assembly 210 sideways into the luggage 200.

Figure 7:
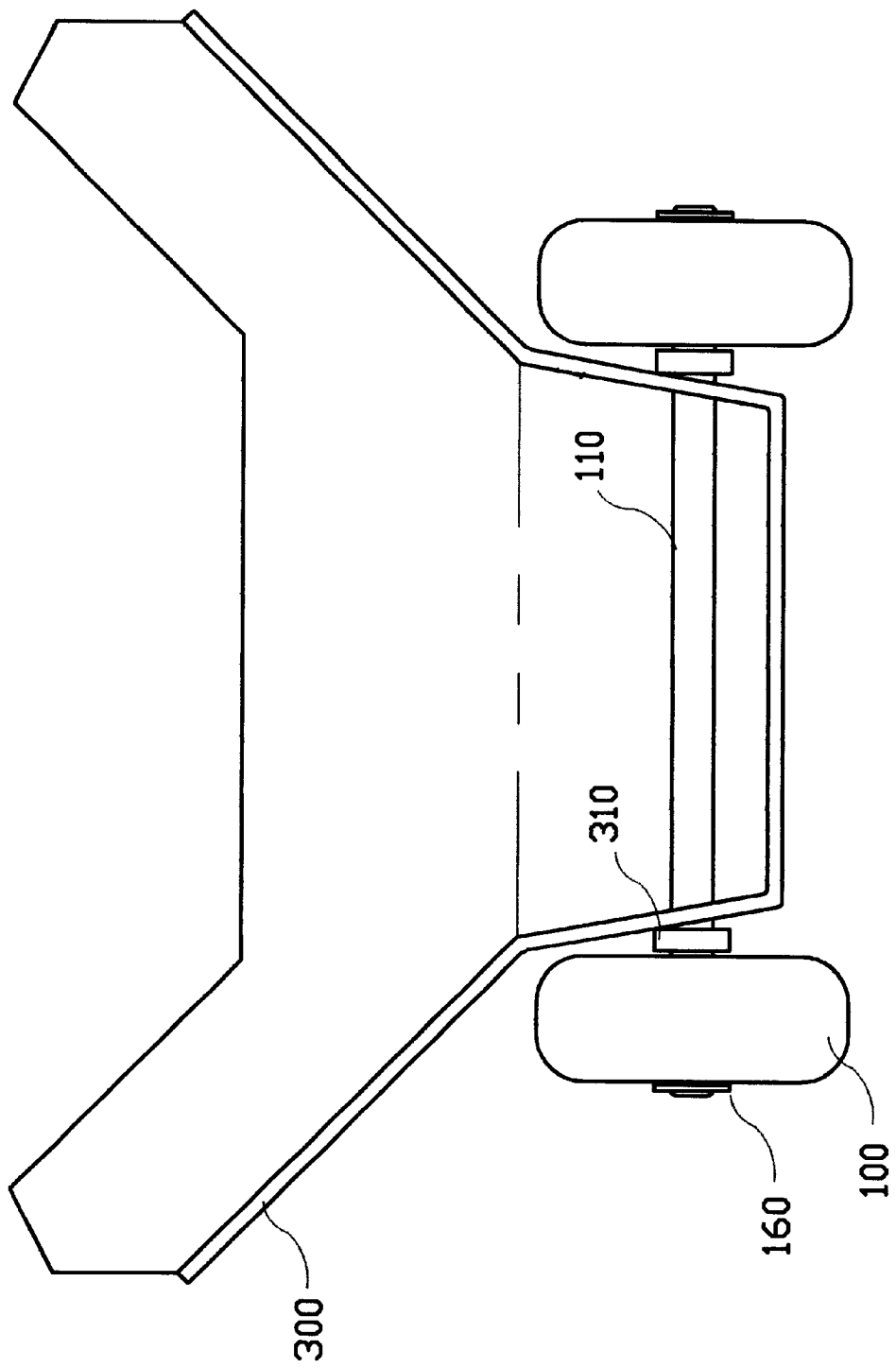
FIG. 7 is a front perspective of the assembly.

FIG. 7 is a front view of the tube wheel assembly 210. The housing 300 is a three-sided enclosure with an open front for accepting the article to be transported. A securing slot 210 is incorporated onto one or more sides of the housing 200. The wheels 100 connected are by an axle 110, with locking washers 160 securing the wheels 100 on the outer end, and nylon spacers 310 on the inner end. The nylon spacers 310 maintain the wheels 100 in proper orientation along the axle 110.

The housing 300 has a 'Y' shaped portion that allows for a wide variety of differing diameters to fit within the assembly. The lower portion of the housing 300 is angularly disposed from the 'Y' portion to allow the wheels 100 to operate properly.

Figure 8:
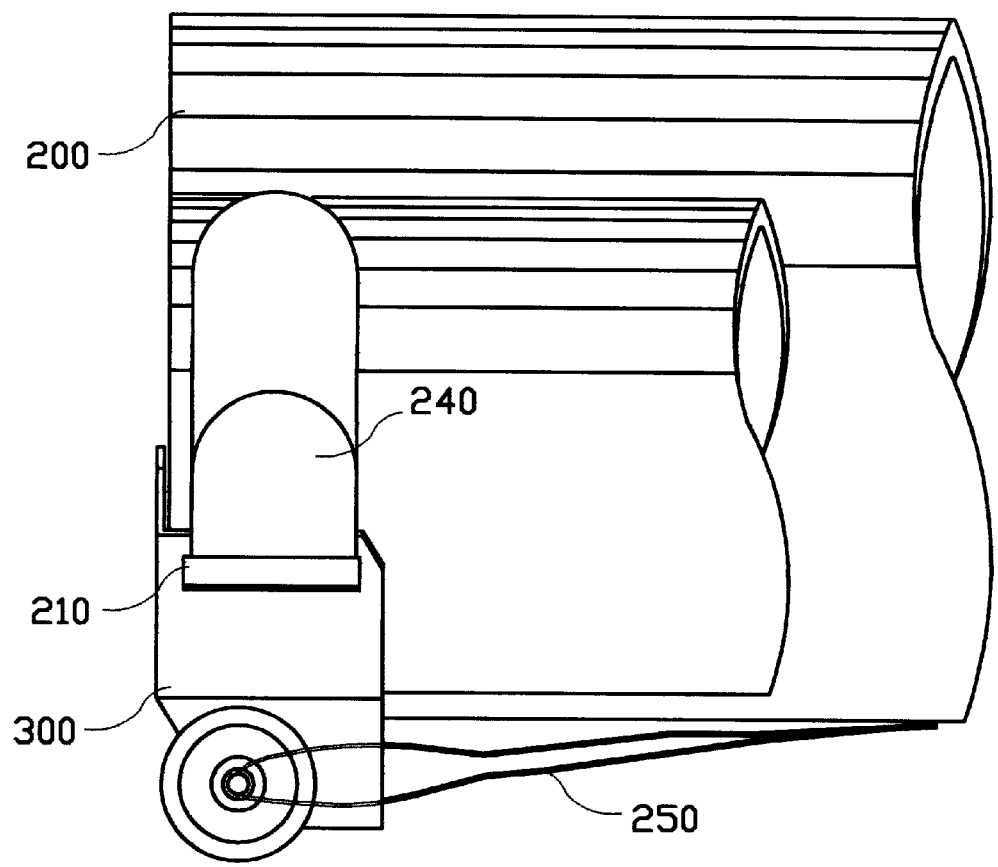
FIG. 8 is a side perspective of the wheel system for a tubular article showing the straps securing the article.

FIG. 8 illustrates the tube assembly 210 in operation, wherein a side securing strap 240 goes through the side securing slot 210 and holds the article 200 to the housing 300. This strap 240 pulls the tube perpendicular to the wheel frame. A single strap can accomplish this by going through the securing slots 210 and around the luggage, especially if the strap is tightly connected. Although flexible strap material is preferred, more rigid strap material provides less movement of the assembly 210 when secured.

The bottom strap 250 is used to interconnect the housing 300 to the cylindrical luggage article 200. The bottom strap 250 wraps around the non-rotating axle 110 and is fastened by a securing means. The secured end of the strap can be affixed on the rear face of the luggage and travel along the tubular luggage 200 and thread around the axle 110. This axle strap 250 serves a dual purpose. It is useful to prevent 'kick-out', where the luggage article 200 pulls away from the underside of housing 300. Second, the bottom strap 250 orients the tube 200 in proper alignment for pulling from the handle 220. If this handle is not oriented opposite of the wheel device, the luggage article 200 will tend to roll or lean to one side.

Figure 9:
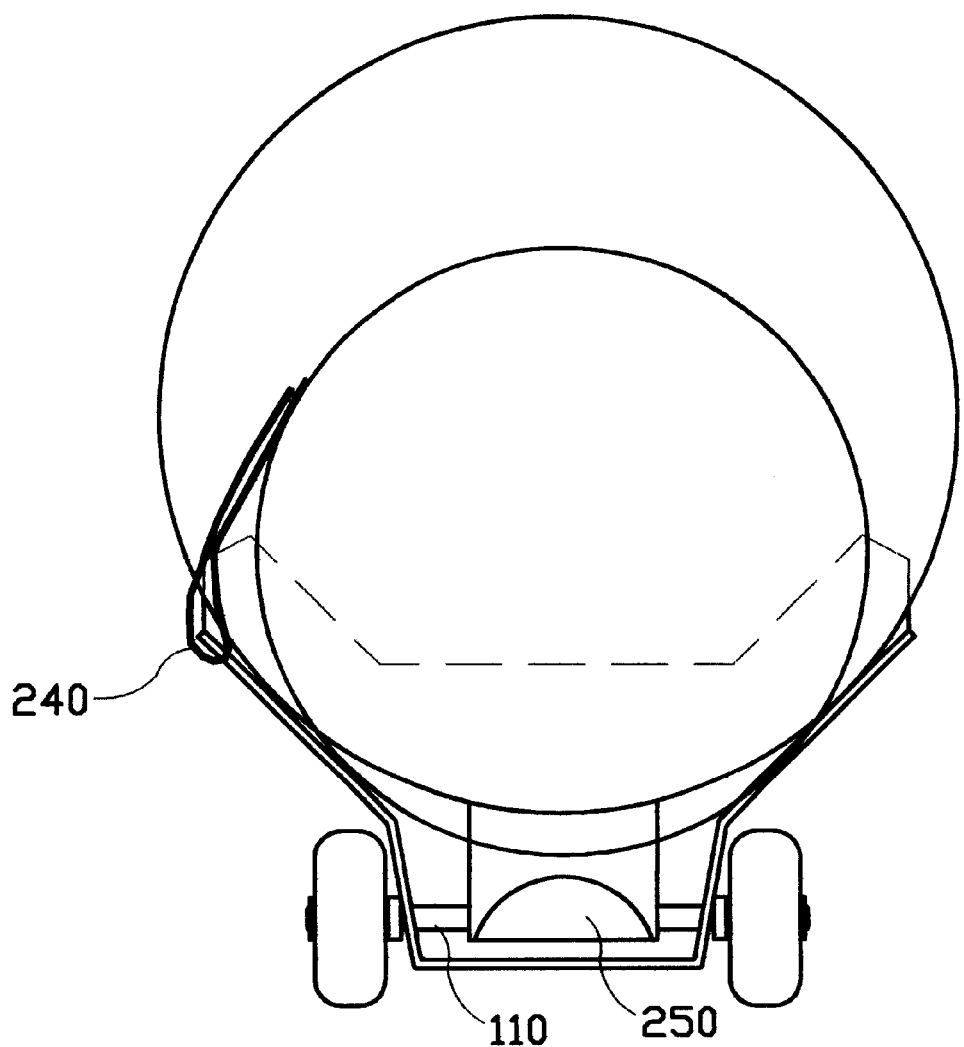
FIG. 9 is a top perspective of the wheel system for a tubular article showing the straps securing the article.

A top view of the tube assembly 210 in operation is shown in FIG. 9. A single securing strap 240 is used to secure the luggage to the assembly 210. The strap 240 goes through a securing slot 210 of the housing 300 and adheres to itself using hook and loop. An optional bottom strap 250 wraps around the axle 110 and also secures to itself using hook and loop. The shape of the housing permits different size articles 200 because of the Y shaped design.

In operation, the wheel assemblies 20, can be stored in one of the compartments of the portfolio until needed. To install the assembly 20, place the luggage onto the assembly 20 so that the contacting lips 70 touch the bottom of the luggage. Detach the loose end of the hook and loop strap from the luggage 10 and feed the securing strap 30 through the securing slot 35. Pull the strap 30 tight and secure the strap 30. Repeat this for the opposing side of the wheel assembly 20, and for all other assemblies 20.

It is well within the scope of the invention to incorporate existing attachment mechanisms and employ manufacturing and molding techniques to incorporate and operate the present invention. The present invention has been particularly shown and described with respect to certain preferred embodiments of features. However, it should be readily apparent to those of ordinary skill in the art that various changes and modifications in form and details may be made without departing from the spirit and scope of the invention. Additional objects and advantages of the present invention may be further realized and attained by means of the instrumentalities and combinations all within the scope of the claims. The drawings and description are to be regarded as illustrative in nature, and not as restrictive.

What is claimed is:

1. A removable wheel system for cylindrical luggage, comprising:
    a housing having an open front, a pair of side flanges angularly disposed from a wheel base section, and a back flange disposed from said wheel base section, wherein said housing supports said cylindrical luggage;
    one or more securing slots on said one or more respective side flanges;
    a securing strap for securing said luggage to said system, wherein said strap engages said
    one or more securing slots of said housing;
    a means for securing said securing strap;
    an axle engaging said wheel base section of said housing wherein said axle extends from both sides of said wheel base section and has a pair of wheels attached at both ends of said axle.

2. The removable wheel system according to claim 1, wherein said means for securing said securing slot is selected from the group consisting of hook and loop, snaps, rivets, buckles, zippers, cinch, and fasteners.

3. The removable wheel system according to claim 1, wherein said axle is non-rotating and said pair of wheels are rotatable.

4. The removable wheel system according to claim 1, wherein said securing strap has a free end and a secured end, said secured end is affixed to said luggage and said free end is threaded through said securing slot and secures to said secured end.

5. A removable wheel system according to claim 1, further comprising a securing slot on each of said side flanges, and a second securing strap, wherein each said securing strap engages a securing slot.

6. A removable wheel system according to claim 1, wherein said securing strap extends from a first securing slot and around said luggage to a second securing slot.

7. A removable wheel system according to claim 1, further comprising an axle strap, wherein said axle strap has a free end and a secured end, and wherein said secured end is attached to said luggage, and said free end is threaded around said axle and fastened onto said axle strap.

8. A removable wheel system kit for cylindrical luggage, comprising:
    a housing having an open front, a pair of side flanges angularly disposed from a wheel base section, and a back flange disposed from said wheel base section, wherein said housing supports said cylindrical luggage, wherein said housing has one or more securing slots on said one or more respective side flanges, and wherein an axle engages said wheel base section and extends from both sides of said wheel base section and has a pair of wheels attached at both ends of said axle;
    a securing strap for securing said luggage to said system, wherein said strap engages said one or more securing slots of said housing and wherein there is a means for securing said securing strap.

9. The kit according to claim 8 wherein said means of securing said strap is selected from the group consisting of hook and loop, snaps, rivets, buckles, zippers, cinches and fasteners.

10. The kit according to claim 8 wherein said means of securing said strap is selected from the group consisting of hook and loop, snaps, rivets, buckles, zippers, cinches and fasteners.

11. The kit according to claim 8, further comprising an axle strap.

* * * * *